US007331182B2

(12) United States Patent
Graf et al.

(10) Patent No.: US 7,331,182 B2
(45) Date of Patent: Feb. 19, 2008

(54) COMBUSTION CHAMBER FOR A GAS TURBINE

(75) Inventors: Peter Graf, Küssaberg (DE); Stefan Tschirren, Nunningen (CH); Helmar Wunderle, Waldshut-Tiengen (DE)

(73) Assignee: ALSTOM Technology Ltd, Baden (CH)

( * ) Notice: Subject to any disclaimer, the term of this patent is extended or adjusted under 35 U.S.C. 154(b) by 9 days.

(21) Appl. No.: 10/890,369

(22) Filed: Jul. 14, 2004

(65) Prior Publication Data

US 2005/0103018 A1 May 19, 2005

Related U.S. Application Data

(63) Continuation of application No. PCT/CH02/00696, filed on Dec. 16, 2002.

(30) Foreign Application Priority Data

Jan. 16, 2002 (CH) .................................... 0067/02

(51) Int. Cl.
*F02C 7/24* (2006.01)

(52) U.S. Cl. ........................................ 60/725; 181/213

(58) Field of Classification Search .................. 60/725; 181/213; 461/114
See application file for complete search history.

(56) References Cited

U.S. PATENT DOCUMENTS

| | | | | |
|---|---|---|---|---|
| 1,357,501 | A | 11/1920 | Lacy | |
| 3,275,015 | A | 9/1966 | Meier | 137/81.5 |
| 5,373,695 | A | 12/1994 | Aigner et al. | 60/39.36 |
| 6,430,933 | B1 | 8/2002 | Keller | 60/772 |
| 6,546,729 | B2 * | 4/2003 | Hellat et al. | 60/725 |
| 6,634,457 | B2 * | 10/2003 | Paschereit et al. | 181/229 |
| 2002/0000343 | A1 | 1/2002 | Paschereit et al. | 181/229 |
| 2002/0100281 | A1 | 8/2002 | Hellat et al. | 60/725 |

FOREIGN PATENT DOCUMENTS

| | | | |
|---|---|---|---|
| DE | 198 33 326 | A1 | 1/2000 |
| DE | 100 26 121 | A1 * | 11/2001 |
| EP | 0 597 138 | A1 | 5/1994 |
| EP | 0 985 882 | A1 | 3/2000 |
| EP | 1 158 247 | A2 | 11/2001 |
| GB | 2 253 076 | A | 8/1992 |
| JP | 51-14550 | | 2/1976 |
| JP | 55-51910 | | 4/1980 |
| WO | WO 93/10401 | | 5/1993 |

* cited by examiner

*Primary Examiner*—William H. Rodrígues
(74) *Attorney, Agent, or Firm*—Steptoe & Johnson LLP

(57) ABSTRACT

At least one Helmholtz damper is arranged at a combustion chamber for a gas turbine in order to damp thermoacoustic oscillations; the damping volume of this Helmholtz damper is in communication with the combustion chamber via a connecting passage. Optimum damping is achieved in a simple way by virtue of the Helmholtz damper being designed in such a manner that its damping frequency is adjustable.

15 Claims, 1 Drawing Sheet

COMBUSTION CHAMBER FOR A GAS TURBINE

CROSS-REFERENCE TO RELATED APPLICATIONS

This application is a continuation of the U.S. National Stage designation of co-pending International Patent Application PCT/CH02/00696 filed Dec. 16, 2002, the entire content of which is expressly incorporated herein by reference thereto.

FIELD OF THE INVENTION

The present invention deals with the field of gas turbine engineering. It relates to a combustion chamber for a gas turbine.

BACKGROUND OF THE INVENTION

A combustion chamber is known, for example, from EP A1 0 597 138 and U.S. Pat. No. 5,373,695.

As is explained in the introduction to the above documents, the problem of thermoacoustic oscillations is becoming increasingly significant in modern low-NOx combustion chambers of gas turbines. Therefore, the prior art has given various proposals for arranging what are known as Helmholtz dampers at the combustion chamber of a gas turbine; the configuration of these dampers, in which a damping volume is in communication with the combustion chamber via a thin connecting passage, means that they are able to effectively damp certain oscillation frequencies in the combustion chamber.

Since the frequency and amplitude of the thermoacoustic oscillations that occur in a combustion chamber are influenced by a very wide range of geometric and operational parameters of the combustion chamber, the likely oscillations in a new combustion chamber cannot be predicted with anything like a sufficient degree of accuracy. It may therefore be the case that the Helmholtz dampers used at the combustion chamber are not optimally matched to the oscillations that actually occur in the combustion chamber.

It has therefore been proposed in the documents mentioned in the introduction for the Helmholtz dampers to be completely or partially exchangeable, in order to allow retrospective changes to be made to the resonant frequency. For this purpose, a manhole is provided in the turbine casing, through which the Helmholtz dampers can be exchanged.

Drawbacks in this context are firstly that matching to a resonant frequency can only take place in stages, that it is very difficult to exchange parts of dampers or entire dampers, and that a considerable design outlay is required at the turbine casing and the combustion chamber for this exchange to be performed.

SUMMARY OF THE INVENTION

Accordingly, the invention relates to providing a combustion chamber for a gas turbine with a Helmholtz damper that avoids the drawbacks of known combustion chambers and in particular is distinguished by greatly simplified adaptation to the frequencies that are to be damped.

The Helmholtz damper is to be designed in such a manner that its damping frequency is adjustable, in particular continuously adjustable. This makes it easy to match the damping to the thermoacoustic characteristics of the combustion chamber, so that it can be optimized accordingly. There is no need to replace parts or entire dampers, and consequently there is no need for correspondingly large access features. At the same time, the adjustability of the Helmholtz dampers eliminates the need to produce and keep available damper parts or dampers of different configuration for different resonant frequencies.

One preferred configuration of the invention is distinguished by the fact that the damping volume of the Helmholtz damper is continuously variable. This type of adjustability for the damping frequency can be realized in a particularly simple and effective way.

In this context, it is particularly expedient for the damping volume to be divided into a fixed damping volume and a variable damping volume, and for the damping volume to be altered by changing the variable damping volume.

It is preferable for the variability of the volume to be achieved by virtue of the variable damping volume being delimited on one side by a displaceable piston. This configuration is in mechanical terms very simple to realize and is functionally reliable and simple to actuate in operation.

A tried-and-tested form of actuation is characterized in that an adjustment element, in particular in the form of a threaded rod, by means of which the piston can be displaced, is arranged at the Helmholtz damper.

Since the combustion chamber is arranged inside a turbine casing, it is particularly advantageous for actuation of the Helmholtz damper if the adjustment element can be actuated through a closeable access opening in the turbine casing. The adjustment element may in this case easily be designed in such a way that only a small opening, which requires only insignificant changes to the turbine casing, is required for its actuation.

The damping action of the Helmholtz damper is particularly great if, in a combustion chamber that has a plurality of burners opening out into the combustion chamber at its entry side, the at least one Helmholtz damper is arranged on the entry side, in the immediate vicinity of the burners. If the combustion chamber is annular and the burners are arranged in concentric rings, the at least one Helmholtz damper is preferably arranged between the rings.

BRIEF DESCRIPTION OF THE DRAWINGS

The invention is to be explained in more detail below on the basis of exemplary embodiments in conjunction with the drawings, in which.

DETAILED DESCRIPTION OF THE PREFERRED EMBODIMENTS

Figure 1:
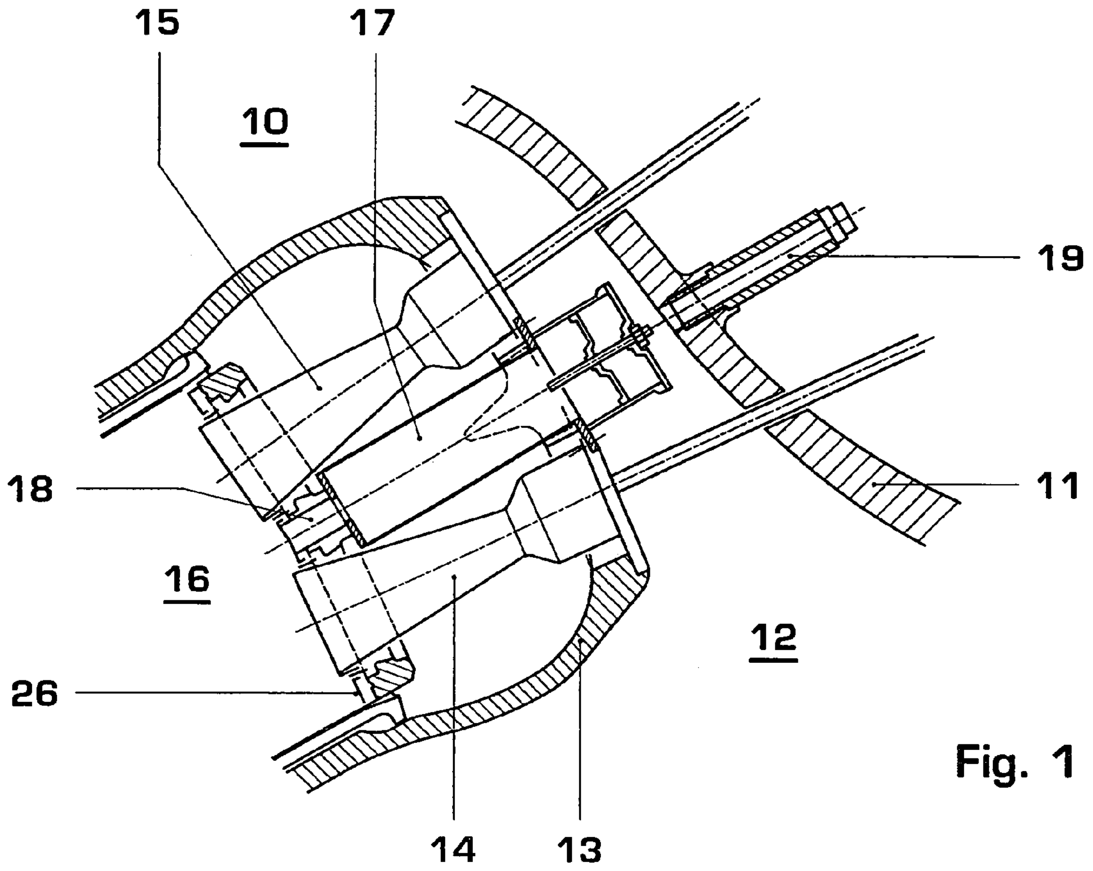
FIG. 1 shows an excerpt from a cross-section through the entry side of a gas turbine combustion chamber with two rings of double-cone burners and adjustable Helmholtz dampers arranged therebetween, in accordance with a preferred exemplary embodiment of the invention.

FIG. 1 shows an excerpt from a cross-section through the entry side of the combustion chamber of a gas turbine with two rings of double-cone burners and adjustable Helmholtz dampers arranged therebetween, in accordance with a preferred exemplary embodiment of the invention. The gas turbine 10 is surrounded by a gas turbine casing 11, inside which there is a plenum 12 filled with compressed air. The plenum 12 surrounds the combustion chamber 16, which is separated from the plenum 12 by a combustion-chamber casing 13. The arrangement of the combustion chamber 16 within the gas turbine 10 is substantially the same as that described in EP A1 0 597 138, which was cited in the introduction. On the entry side, the combustion chamber 16 is delimited within the combustion-chamber casing 13 by a front cover 26. The combustion chamber 16 is annular in design and is fitted with burners 14, 15 that are configured in a known way as double-cone burners and are arranged in rings around the axis of the gas turbine, as disclosed by EP A1 0 597 138.

Figure 2:
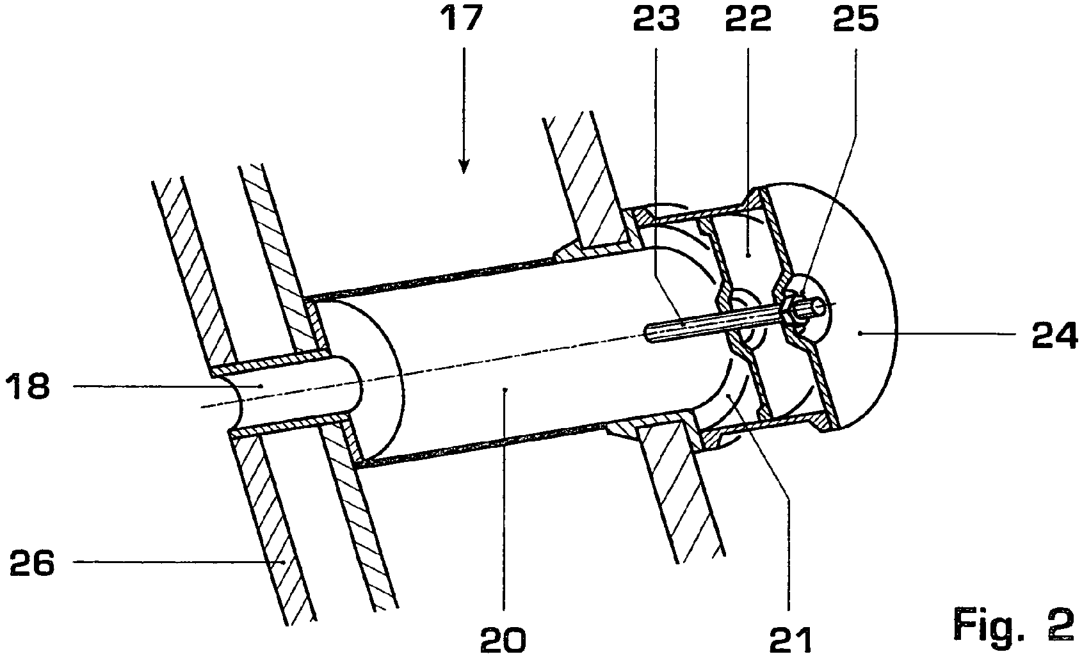
FIG. 2 shows an enlarged sectional illustration of the Helmholtz damper from FIG. 1.

The burners 14, 15 are arranged in corresponding openings in the front cover 26 and open out into the combustion chamber 16. Helmholtz dampers 17 are provided between the rings comprising the burners 14, 15 in order to damp the thermoacoustic oscillations excited in the combustion chamber 16 during the combustion operation. As shown in FIG. 2, the Helmholtz dampers 17 each have a damping volume 20, 21, that is composed of a fixed cylindrical damping volume 20 and a variable cylindrical damping volume 21. The damping volume 20, 21 is connected to the combustion chamber 16 via a relatively narrow connecting passage 18. The arrangement comprising connecting passage 18 and damping volume 20, 21 forms a damping resonator, the resonant frequency of which is determined, inter alia, by the size of the damping volume 20, 21.

The fixed damping volume 20 is selected in such a way that the damping frequency that can thereby be attained is in the vicinity of the frequency of one of the thermoacoustic oscillations to be expected in the combustion chamber 16, and that the possible range of variations in this frequency is covered when the variable damping volume 21 is added. It is in this way possible for the Helmholtz dampers 17 in a gas turbine that is to be newly commissioned to be accurately matched to the oscillation frequencies that occur and were not accurately known in advance, so that optimum damping is obtained by the easiest possible route. It will be readily understood that differently dimensioned Helmholtz dampers 17 can also be used in combination to damp different oscillation frequencies.

The change in the variable damping volume 21 may in principle be brought about in various ways. For example, it is conceivable for the variable damping volume to be composed of a plurality of partial volumes that can be connected up in succession. However, the configuration shown in FIGS. 1 and 2, in which the variable damping volume can be altered continuously by means of a piston 22 arranged displaceably in the volume, is particularly favorable for the adjustability. The piston 22 is displaced in a particularly simple and reliable way by means of an adjustment element 23 in the form of a threaded rod that is mounted rotatably in a threaded hole 25 in the cover 24 and closes off the variable volume 21 with respect to the outside. Alternatively, the piston 22 also may be fixedly connected to the adjustment element 23. In this case, the adjustment is effected by a screw thread in the cover 24, in which the adjustment element 23 is guided. By way of example, a slot in which the blade of a screwdriver can engage may be provided on the outer end side of the adjustment element 23. If the adjustment element (the threaded rod) 23 is rotated, the piston 22 moves along the cylinder axis of the damping volume 20, 21 and can adopt various positions, as indicated in FIG. 1. The frequency at which the damping occurs or reaches its maximum also changes correspondingly with the damping volume 20, 21.

The design of the adjustment element 23 creates the option of simple actuation of the adjustment element 23 from outside the turbine casing 11 without extensive features having to be added to the turbine casing. According to FIG. 1, a relatively small access opening 19 which comprises a screwed-in, closeable connection piece is provided on the turbine casing 11, aligned with the axis of rotation, for actuation of the adjustment element 23. It is in this way possible without great difficulty to optimally match the damping properties of the individual Helmholtz dampers 17 to the thermoacoustic oscillations that actually occur when the combustion chamber 16 is operating.

LIST OF DESIGNATIONS

10 gas turbine
11 turbine casing
12 plenum
13 combustion chamber casing
14, 15 burners
16 combustion chamber
17 helmholtz damper
18 connecting passage
19 access opening
20 damping volume (fixed)
21 damping volume (variable)
22 piston
23 adjustment element (e.g. threaded rod)
24 cover
25 threaded hole
26 front cover

What is claimed is:

1. A combustion chamber for a gas turbine, the combustion chamber being surrounded by a gas turbine casing inside of which is disposed a plenum filled with compressed air, the plenum surrounding the combustion chamber, and the combustion chamber being separated from the plenum by a combustion chamber casing, the combustion chamber comprising at least one Helmholtz damper for damping thermoacoustic oscillations, the Helmholtz damper having a damping volume in communication with the combustion chamber via a connecting passage, wherein the Helmholtz damper is configured to have a damping frequency that is adjustable, the damping volume being divided into a fixed damping volume arranged inside the combustion chamber casing and being in fluid communication with the combustion chamber, and a variable damping volume arranged within the plenum and being in fluid communication with the combustion chamber, the damping volume being varied by changing the variable damping volume, and the fixed damping volume being selectable so that the damping frequency is proximate a frequency of a thermoacoustic oscillation of the combustion chamber and adjustable by changing the variable damping volume.

2. The combustion chamber of claim 1, wherein the damping volume of the Helmholtz damper is continuously variable.

3. The combustion chamber of claim 1, wherein the combustion chamber, on an entry side, has a plurality of burners that open out into the combustion chamber, and the at least one Helmholtz damper is arranged on the entry side, in the immediate vicinity of the burners.

4. A combustion chamber for a gas turbine comprising at least one Helmholtz damper for damping thermoacoustic oscillations, the Helmholtz damper having a damping volume in communication with the combustion chamber via a connecting passage, wherein the Helmholtz damper is configured to have a damping frequency that is adjustable, the damping volume being divided into a fixed damping volume and a variable damping volume, the damping volume being varied by changing the variable damping volume, and the fixed damping volume being selectable so that the damping frequency is proximate a frequency of a thermoacoustic oscillation of the combustion chamber and adjustable by changing the variable damping volume;

wherein the damping volume of the Helmholtz damper is continuously variable; and wherein the variable damping volume is delimited on one side by a displaceable piston.

5. A combustion chamber for a gas turbine comprising:

at least one Helmholtz damper for damping thermoacoustic oscillations, the Helmholtz damper having a damping volume in communication with the combustion chamber via a connecting passage, the Helmholtz damper being configured to have an adjustable damping frequency, the damping volume of the Helmholtz damper being continuously variable, the damping volume being divided into a fixed damping volume and a variable damping volume, and the damping volume being varied by changing the variable damping volume, the variable damping volume being delimited on one side by a displaceable piston; and an adjustment element arranged at the Helmholtz damper, the adjustable element being in the form of a threaded rod by means of which the piston can be displaced.

6. The combustion chamber of claim 5, wherein the combustion chamber is disposed inside a turbine casing and the adjustment element can be actuated through a closeable access opening in the turbine casing.

7. A combustion chamber for a gas turbine comprising at least one Helmholtz damper for damping thermoacoustic oscillations, the Helmholtz damper having a damping volume in communication with the combustion chamber via a connecting passage, wherein the Helmholtz damper is configured to have an adjustable damping frequency, the combustion chamber, on an entry side, has a plurality of burners that open out into the combustion chamber, the at least one Helmholtz damper is arranged on the entry side, in the immediate vicinity of the burners, the combustion chamber is annular, the burners are arranged in concentric rings, and the at least one Helmholtz damper is arranged between the rings in a radial direction.

8. A combustion chamber for a gas turbine, the combustion chamber being surrounded by a gas turbine casing inside of which is disposed a plenum filled with compressed air, the plenum surrounding the combustion chamber, and the combustion chamber being separated from the plenum by a combustion chamber casing, the combustion chamber comprising a Helmholtz damper for damping thermoacoustic oscillations, the Helmholtz damper forming a damping resonator in communication with the combustion chamber and having an adjustable damping volume, the damping volume being divided into a fixed damping volume arranged inside the combustion chamber casing and being in fluid communication with the combustion chamber, and a variable damping volume arranged within the plenum and being in fluid communication with the combustion chamber, the damping volume being varied by changing the variable damping volume, and the fixed damping volume being selectable so that a damping frequency of the Helmholtz damper is proximate a frequency of a thermoacoustic oscillation of the combustion chamber and adjustable by changing the variable damping volume.

9. The combustion chamber of claim 8, wherein the damping resonator comprises a connecting passage in communication with the adjustable damping volume.

10. The combustion chamber of claim 8, wherein the damping frequency of the Helmholtz damper is continuously adjustable.

11. The combustion chamber of claim 8, further comprising a plurality of burners that open out on an entry side of the combustion chamber, wherein the Helmholtz damper is disposed proximate the burners.

12. The combustion chamber of claim 8, wherein the fixed damping volume is cylindrical and the variable damping volume is cylindrical.

13. A combustion chamber for a gas turbine comprising a Helmholtz damper for damping thermoacoustic oscillations, the Helmholtz damper forming a damping resonator in communication with the combustion chamber and having an adjustable damping volume, the damping volume being divided into a fixed damping volume and a variable damping volume, the damping volume being varied by changing the variable damping volume, and the fixed damping volume being selectable so that a damping frequency of the Helmholtz damper is proximate a frequency of a thermoacoustic oscillation of the combustion chamber and adjustable by changing the variable damping volume, wherein the Helmholtz damper comprises a piston for adjusting the damping volume.

14. A combustion chamber for a gas turbine comprising a Helmholtz damper for damping thermoacoustic oscillations, the Helmholtz damper forming a damping resonator in communication with the combustion chamber and having an adjustable damping volume, the combustion chamber further comprising a plurality of burners, wherein the combustion chamber is annular, the burners are arranged in concentric rings, and the Helmholtz damper is arranged between the rings in a radial direction.

15. A combustion chamber for a gas turbine, the combustion chamber being surrounded by a gas turbine casing inside of which is disposed a plenum filled with compressed air, the plenum surrounding the combustion chamber, and the combustion chamber being separated from the plenum by a combustion chamber casing, the combustion chamber comprising:

a plurality of burners; and a Helmholtz damper that forms a damping resonator in communication with the combustion chamber and is configured and located to damp thermoacoustic oscillations excited in the combustion chamber during a combustion operation;

wherein the Helmholtz damper has a continuously adjustable damping frequency and a damping volume divided into a fixed damping volume arranged inside the combustion chamber casing and being in fluid communication with the combustion chamber and a variable damping volume arranged within the plenum and being in fluid communication with the combustion chamber.

* * * * *